United States Patent [19]

Ishitobi

[11] Patent Number: 4,501,928
[45] Date of Patent: Feb. 26, 1985

[54] SHIELDING TAPE AND ELECTRIC CABLES USING SAME

[75] Inventor: Masami Ishitobi, Yokohama, Japan

[73] Assignee: Dainichi-Nippon Cables, Ltd., Hyogo, Japan

[21] Appl. No.: 492,600

[22] Filed: May 9, 1983

[51] Int. Cl.³ .............................................. H01B 7/28
[52] U.S. Cl. ........................ 174/107; 174/106 SC; 174/110 V; 428/356; 428/383; 428/463
[58] Field of Search ............ 174/102 R, 106 SC, 107, 174/110 V; 428/383, 354, 356, 463

[56] References Cited

U.S. PATENT DOCUMENTS

| | | | |
|---|---|---|---|
| 3,681,515 | 8/1972 | Mildner | 174/107 |
| 4,020,276 | 4/1977 | Maingueneau | 174/107 X |
| 4,042,776 | 8/1977 | Matsuba et al. | 174/107 X |
| 4,107,370 | 8/1978 | Ingraham | 428/383 |
| 4,145,567 | 3/1979 | Bahder et al. | 174/107 |
| 4,292,463 | 9/1981 | Bow et al. | 174/107 |

FOREIGN PATENT DOCUMENTS 52-151882 12/1977 Japan.
55-12654 1/1980 Japan.

Primary Examiner—A. T. Grimley
Assistant Examiner—Morris H. Nimmo
Attorney, Agent, or Firm—Armstrong, Nikaido, Marmelstein & Kubovcik

[57] ABSTRACT

A shielding tape comprising a lead foil having a layer of vinyl chloride polymer on its one surface and having on the other surface thereof a layer of vinyl chloride polymer and a layer of an adhesive not reaction-curable formed over the latter layer. Also disclosed is an electric cable comprising a sheath of vinyl chloride polymer and a water impermeable layer provided by a shielding tape having the same structure as above and longitudinally placed beneath the sheath. With an adhesive of the above-mentioned type, the sheath is adhered to the underlying vinyl chloride polymer layer of the tape, and the polymer layers of the tape are also adhered to each other at the lap of the tape.

9 Claims, 4 Drawing Figures

SHIELDING TAPE AND ELECTRIC CABLES USING SAME

BACKGROUND OF THE INVENTION

1. Field of the Invention

The present invention relates to a shielding tape comprising a lead foil laminated with plastics, and to electric cables in which the cable core is shielded from water by the tape.

2. Description of the Prior Art

It is well known that water impairs the characteristics of electric cables when penetrating into the insulation layer through the sheath. In the case of power cables, for example, there arises the problem of a water tree developing in the insulation layer, while with communication cables, impaired insulating characteristics of the insulation layer permit interference. To prevent the penetration of water, Published Unexamined Japanese patent application No. 12654/1980 proposes to envelop the cable core with a tape of lead foil laminated with a polyester and form a sheath over the tape envelop. In this case, the inner surface of the sheath is adhered to the polyester layer of the tape, and the tape to itself at its lap, with an adhesive applied to the polyester layer. The use of the known tape nevertheless entails the problem that the plasticizer migrating from the sheath of polyvinyl chloride or the water passing through the sheath lowers the bond strength between the sheath and the polyester layer to permit separation of the tape from the sheath. If such separation occurs, objections could result; the water impermeable tape layer will collapse when the cable is bent during installation work, or water will be trapped in a space formed between the sheath and the tape layer.

SUMMARY OF THE INVENTION

An object of the present invention is to provide a shielding tape comprising a lead foil laminated with plastics.

Another object of the present invention is to provide a shielding tape having high ability to adhere to polyvinyl chloride containing a plasticizer.

A further object of the present invention is to provide a shielding tape which is useful for blocking water.

A still further object of the present invention is to provide a polyvinyl chloride sheathed electric cable which is highly impermeable to water.

In one aspect, the present invention provides a shielding tape comprising a lead foil having a layer of vinyl chloride polymer on its one surface and having on the other surface thereof a layer of vinyl chloride polymer and an adhesive layer formed over the latter layer. In another aspect, the present invention provides a water impermeable electric cable comprising a sheath of vinyl chloride polymer and a water impermeable layer of a shielding tape longitudinally placed beneath the sheath and composed of a lead foil and a layer of vinyl chloride polymer formed over each surface of the lead foil, the sheath being adhered to the underlying vinyl chloride polymer layer of the shielding tape, the shielding tape overlapping itself with its vinyl chloride polymer layers adhered to each other at the lap.

DETAILED DESCRIPTION OF THE INVENTION

Figure 1:
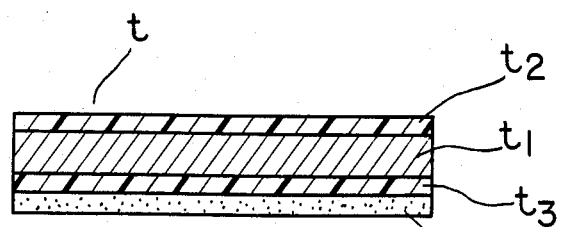
FIG. 1 is a sectional view showing an embodiment of shielding tape of the present invention.
Figure 2:
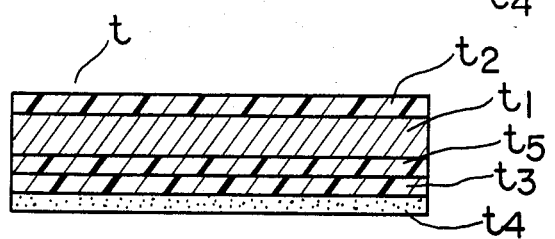
FIG. 2 is a sectional view showing another embodiment of shielding tape of the present invention.

With reference to FIGS. 1 and 2, a shielding tape t comprises a lead foil t1, layers t2 and t3 of vinyl chloride polymer formed on opposite sides of the lead foil t1 respectively, and an adhesive layer t4 formed on the vinyl chloride polymer layer t3. With the embodiment shown in FIG. 2, a layer t5 of heat-resistant organic high polymer is further interposed between the lead foil t1 and the vinyl chloride polymer layer t3.

The lead forming the lead foil t1 may be pure lead, or any of various lead alloys having a coefficient of elasticity of 100 to 500 kg/mm$^2$, preferably 200 to 400 kg/mm$^2$. The lead foil t1 is 10 to 300 μm, preferably 25 to 100 μm, in thickness.

The lead foil, which is more malleable or flexible than aluminum foil, has the advantage of readily forming a water impermeable layer as longitudinally place on a cable core or like elongated member in intimate contact therewith. However, the lead foil has the drawback of being easily collapsed or wrinkled by an external force. According to the invention, therefore, the lead foil t1 is supported by the vinyl chloride polymer layers t2 and t3 on its opposite side to remedy the drawback.

Examples of useful vinyl chloride polymers for forming the layers t2 and t3 are vinyl chloride homopolymer; copolymers of vinyl chloride and one or at least two of other components copolymerizable with vinyl chloride and including α-olefins such as ethylene, propylene and butene-1, vinyl acetate and derivatives thereof such as ethylene vinylacetate, ethylenically unsaturated carboxylic acids and their derivatives such as acrylic acid, methacrylic acid, methyl acrylate, ethyl acrylate, maleic acid, maleimide and ethyl maleimide, and vinyl ethers such as ethyl vinyl ether and propyl vinyl ether; and further the above homopolymer or copolymers grafted with the monomers or polymers of the components copolymerizable with vinyl chloride. Preferably the vinyl chloride polymers to be used in the present invention contain at least 30% by weight, especially at least 50% by weight, of vinyl chloride component. Especially preferred vinyl chloride polymers are homopolymer of vinyl chloride, vinyl chloride-vinyl acetate copolymer, vinyl chloride-ethylene vinylacetate copolymer, vinyl chloride-vinyl acetate-maleic acid copolymer, etc.

Two or more such vinyl chloride polymers can be used in admixture. Furthermore, the vinyl chloride polymer may be used in admixture with one or at least two of polyolefins such as polyethylene, polypropylene, ethylene-vinyl acetate copolymer, ethylene-ethyl acrylate copolymer and ethylene-propylene-diene copolymer, or rubbers and plastics other than the vinyl chloride polymers exemplified above. In this case, however, it is preferable that the mixture contain at least 30% by weight, more advantageously at least 50% by weight, of the vinyl chloride component.

The vinyl chloride polymer, which is preferably free from plasticizers, may contain a plasticizer. In this case, it is desirable to limit the use of plasticizer to a small amount of up to 30 parts by weight, preferably up to 20 parts by weight, per 100 parts by weight of the vinyl chloride polymer. Examples of useful plasticizers are those already known for use with polyvinyl chloride, above all, those given later. When required, the vinyl chloride polymer may contain a stabilizer, lubricant, flame retardant, coloring agent, etc.

The material forming the layer t2 or layer t3 must be at least 1.5 kg/mm$^2$ in tensile strength and at least 1 kg/mm$^2$ in 100% modulus. When failing to fulfill this requirement, the material is unsatisfactory for supporting the lead foil t1. The layer t2 and layer t3 are 5 to 500 μm in thickness. If thinner than 5 μm, the layers have difficulty in supporting the lead foil, whereas if thicker than 500 μm, the layers impair the aforementioned advantage of the lead foil t1 due to its flexibility. More preferably the layer t2 and layer t3 have a thickness of 10 to 200 μm.

The adhesive layer t4 is prepared from a material which is known for use with polyvinyl chloride and exhibits adhering properties when softened or melted with heat but which is not thermosetting. Preferred materials are 7 to 12, especially 8 to 11 in solubility parameter value and 70° to 150° C. in Vicat softening point as determined according to ASTM D 1525.

Examples of preferred adhesives are given below.

(i) Polymers of esters of acrylic acid or its derivatives, e.g., methyl, ethyl and butyl acrylates or methacrylates, having an average molecular weight of about 1,000 to about 100,000.

(ii) Vinyl chloride-vinyl acetate copolymer having an average polymerization degree of 100 to 1,000, preferably 300 to 600, and containing 5 to 50 parts by weight, preferably 10 to 30 parts by weight, of vinyl acetate component per 100 parts by weight of vinyl chloride component.

(iii) Vinyl chloride-vinyl acetate-maleic acid copolymer having an average polymerization degree of 100 to 1,000, preferably 300 to 600, and containing 5 to 50 parts by weight, preferably 10 to 30 parts by weight, of vinyl acetate component and 0.1 to 15 parts by weight, preferably 0.5 to 5 parts by weight, of maleic acid component, per 100 parts by weight of vinyl chloride component.

(iv) Butadiene-acrylonitrile copolymer having an average molecular weight of 20,000 to 200,000 and a Mooney viscosity (ML$_{1+4}$) of 40 to 90 and containing 10 to 50% by weight, preferably 20 to 45% by weight, of acrylonitrile component.

(v) Thermoplastic saturated polyester the soft segment of which is, for example, diethylene glycol, triethylene glycol, butylene glycol, glycerin or the like and which is prepared by esterifying phthalic acid with at least one of these components and polymerizing the ester, the polyester further containing a dibasic acid, such as adipic acid, azelaic acid, sebacic acid or trimellitic acid, as the third component.

(vi) Phenolic resin 500 to 10,000 in average molecular weight.

(vii) Epoxy resin 300 to 4,000 in average molecular weight.

(viii) Phenoxy resin 20,000 to 40,000 in average molecular weight.

(ix) Alkyd resin 2,000 to 5,000 in average molecular weight.

(x) Chloroprene rubber 20,000 to 200,000 in average molecular weight.

(xi) Vinyl chloride homopolymer or copolymers 100 to 500 in average polymerization degree.

Of the examples (i) to (xi) given above, especially preferable are the compounds (i) to (v), and a mixture of one selected from among (i) to (v) and 5 to 100 parts by weight of at least one selected from among (vi) to (xi) per 100 parts by weight of the former. Also desirable is a mixture of the compound (ii) or (iii) and 1 to 50 parts by weight of the compound (iv) per 100 parts by weight of the former.

While the adhesive layer t4 may consist singly of the adhesive such as one mentioned above, a small amount of plasticizer, if admixed therewith, affords stabilized bond strength. The plasticizer is especially effective for use with the adhesive (ii) or (iii).

Useful plasticizers are those already known for use with polyvinyl chloride. Especially suitable are those having a solubility parameter value of 7 to 11, a boiling point of at least 300° C. (at 760 mm Hg) and a vapor pressure of up to 2.0 mm Hg at 100° C.

Specific examples of especially preferable plasticizers are phthalates such as dioctyl phthalate, dinonyl phthalate, diisodecyl phthalate and dibutyl phthalate, trimellitates such as tri-2-ethylhexyl trimellitate and triisooctyl trimellitate, phosphates such as tricresyl phosphate, trioctyl phosphate and triphenyl phosphate, adipates such as diisodecyl adipate and diisooctyl adipate, epoxidized oils prepared by epoxidizing soybean oil, rapeseed oil and like natural oils, fatty acid esters or chlorinated fatty acid esters such as butyl oleate or methyl tetrachlorostearate, tetrahydrophthalates such as di-n-octyl tetrahydrophthalate and diisodecyl tetrahydrophthalate, etc.

The plasticizer is used in an amount of 5 to 60 parts by weight, preferably 10 to 30 parts by weight, per 100 parts by weight of the adhesive. The adhesive layer t4 needs only to have a thickness required for effecting the desired adhesion and is generally 3 to 50 μm. The layer t4 can be formed by applying the adhesive as dissolved in a suitable solvent having affinity therefor and drying the coating, or by thermally adhering a sheet of adhesive to the vinyl chloride polymer layer t3.

With reference to FIG. 1, the vinyl chloride polymer layer t2 or t3 may be adhered to the lead foil t1 with an adhesive not reaction-curable, such as the material forming the adhesive layer t4, or preferably with a reaction curable adhesive, such as epoxy or polyurethane type. The adhesive layer t4 can be adhered to the vinyl chloride polymer layer t3 by the adhesion of the layer t4 itself.

When covering a cable core with the shielding tape shown in FIG. 1, the tape is longitudinally placed over the core with the adhesive layer t4 of the tape out. A sheath of vinyl chloride polymer is then extruded over the tape. The sheath is adhered to the tape with the adhesive layer t4 by the high temperature of the vinyl chloride polymer extruded.

The cable core can be enveloped with the shielding tape without leaving large clearance therebetween when the tape is longitudianlly placed over the cable core while tensioning the tape. In this case, however, the high temperature of the sheathing polymer extruded softens the constituent materials of the vinyl chloride layers t2, t3 and adhesive layer t4 of the tape to totally eliminate the mechanical strength of these layers, with the resulting likelihood that the tension acting solely on the lead foil t1 will break the tape.

With the embodiment of FIG. 2, however, the heat-resistant organic high polymer layer t5 interposed between the lead foil t1 and the vinyl chloride layer t3 prevents the great reduction in the mechanical strength of the tape even if the layers t2, t3 and t4 are softened.

The layer t5 is made of a material which will not permit a marked reduction in the mechanical strength of the layer t5 even when heated by the high temperature (T° C.) of vinyl chloride polymer extruded. Preferably the material has a softening point or melting point which is higher than T° C. Materials having a softening point or melting point of at least 200° C. are generally usable.

Examples of preferred materials for forming the layer t5 are polar heat-resistant polymers at least 2.5 in dielectric constant as measured at room temperature and 60 Hz, including polyethylene terephthalate, polybutylene terephthalate and like polyesters, nylons and like polyamides, polyamidoimides, polyimides, polysulfones, polyphenylene oxides, polycarbonates, etc. According to the present invention, the layer t5, which is positioned as illustrated in FIG. 2, may alternatively be positioned, for example, between the layer t1 and layer t2, or over the layer t2, except over the layer t4 or between the layer t4 and layer t3.

The polar heat-resistant polymers, because of their polarity, can be effectively adhered to the lead foil t1 and also to the vinyl chloride polymer layer t2 or t3 with the above-mentioned reaction curable adhesive. With the tape disclosed in Published Unexamined Japanese patent application No. 12654/1980, the plasticizer migrating from the cable sheath of polyvinyl chloride is liable to cause separation between the polyester layer and the sheath, in other words between water impermeable tape and sheath, as already stated. Nevertheless, with the tape of the invention having such a structure as shown in FIG. 2, the water impermeable layer provided by the tape unexpectedly exhibits good adhesion to the polyvinyl sheath, despite the presence of the layer t5 of polyester or like heat-resistant polymer.

The shielding tape of the present invention is usable not only for electric cables but also for various pipes, such as water supply pipes, gas pipes, hot water supply pipes, transport pipes for petroleum and chemicals and cable ducts, hoses, tubes, rods and like elongated bodies to protect them from water, chemicals, organic solvents, radiation, etc.

When it is desired to electrically connect the elongated body to be enveloped to the lead foil of the present shielding tape, the vinyl chloride polymer layer t2 is formed from a conductive vinyl chloride polymer composition and adhered to the lead foil t1 with a conductive adhesive. The tape of such a structure is also included in the present invention as an embodiment.

The conductive vinyl chloride polymer composition is prepared by admixing carbon black, metal powder or other conductivity imparting agent with one of the aforementioned vinyl chloride polymers or with a mixture of at least two of them. The composition preferably has a volume resistivity of up to $10^7$ $\Omega \cdot cm$, more preferably about $10^1$ to $10^6$ $\Omega \cdot cm$, at room temperature. Examples of useful conductivity imparting agents are acetylene black and conductive carbon black, such as the one mentioned below and having an increased surface area. A specific example of composition desirable for forming the layer t2 comprises one of the foregoing vinyl chloride polymer and 10 to 90 parts by weight of such a conductivity imparting agent per 100 parts by weight of the polymer, the composition having a conductivity in the above-specified range. The composition may have the above-mentioned plasticizer incorporated therein.

The layer t2 of the conductive vinyl chloride polymer composition is adhered to the lead foil t1 with a conductive adhesive comprising at least one of the foregoing adhesives for forming the adhesive layer t4 and the conductivity imparting agent admixed therewith. Preferable as the conductive adhesive is a composition having a low volume resistivity of up to $10^6$ $\Omega \cdot cm$ and comprising the copolymer (ii) or (iii) included in the foregoing adhesives and carbon black, having an increased suface area of at least 500 $m^2/g$ in terms of BET surface area and at least 250 ml/100 g in DBP oil absorption as measured according to JIS K 6221-1970, in an amount of 10 to 30 parts by weight, preferably 15 to 25 parts by weight, per 100 parts by weight of the copolymer. Ketzen Black (brand name), product of Lion Co., Ltd., Japan, is a useful example of such carbon black. Generally the addition of carbon black to adhesives adversely affects the bond strength, whereas the carbon black of increased surface area affords sufficient conductivity without entailing a reduction in the bond strength when used in a small amount of up to 30 parts by weight. Accordingly the adhesive composition containing the carbon black has satisfactory bond strength and conductivity.

Figure 3:
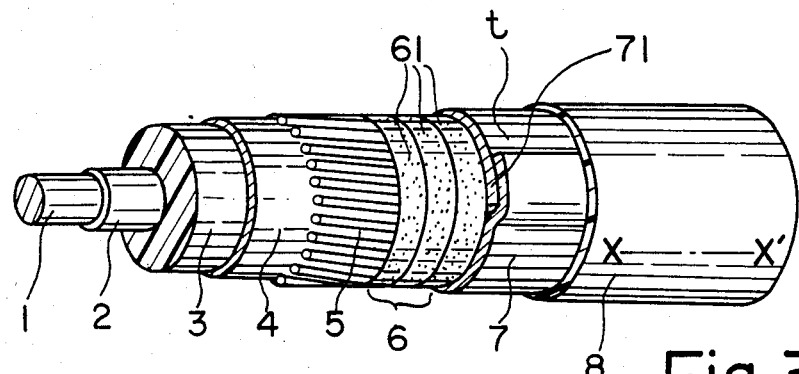
FIG. 3 is a perspective view showing an electric cable of the invention having a water impermeable layer formed of the shielding tape of FIG. 1 or 2.
Figure 4:
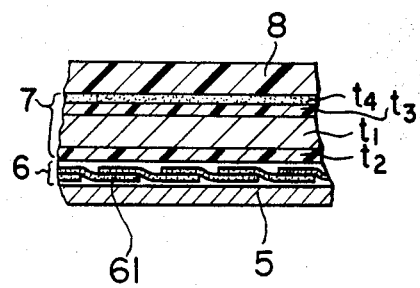
FIG. 4 is a fragmentary view showing the cable in section along the line X—X' in FIG. 3.

The present invention will be further described with reference to FIGS. 3 and 4. The cable core shown comprises a conductor 1, conductor shielding layer 2, electrically insulating layer 3, insulation shielding layer 4, metal shield layer 5 made of wire strands, and layer 6 of holding tape 61 wound around the layer 5. The cable core is enveloped with a water impermeable layer 7 which is formed from a shielding tape t having the structure shown in FIG. 1 or 2 by longitudinally placing the tape t over the cable core with its adhesive layer t4 out. The layer 7 is covered with a sheath 8 of vinyl chloride polymer. The water impermeable layer 7 is adhered to the inner surface of the sheath 8 with the adhesive layer t4 which is softened or melted due to the high temperature of the sheath 8 extruded.

When it is desired to electrically connect the lead foil t1 of the shielding tape t to the metal shield layer 5, the shielding tape used comprises a vinyl chloride polymer layer t2 made of the conductive vinyl chloride polymer described and adhered to the lead foil t1 with a conductive adhesive, and the layer 6 is formed by winding a holding tape 61 which has resistivity lower than $10^6$ $\Omega \cdot cm$ in terms of volume resistivity.

The conductive holding tape can be prepared from a woven or nonwoven fabric or paper of natural or synthetic fiber having incorporated therein carbon black, metal powder or like conductivity imparting agent, or impregnated with a coating composition containing such an agent and dried, or topped with unvulcanized rubber containing the agent, or having the rubber applied thereto both internally and externally. Also suitable is a holding tape made of a woven or nonwoven fabric which has threads of copper, aluminum or like conductive metal incorporated therein by weaving.

When the layer 6 is formed by gap-winding or lap-winding a holding tape having a relatively large thickness of about 200 to about 1,000 $\mu m$, indentations and projections are produced on the surface of the layer 6 due to the thickness of the tape. On the other hand, if there is a clearance between the water impermeable layer 7 and the cable core, a problem arises in that a longitudinal wrinkle will occur in the layer 7 due to the pressure of vinyl chloride polymer extruded for forming the sheath 8. To eliminate the clearance, therefore, the layer 7 is formed by longitudinally placing the shielding tape t over the core while tightening up the tape circumferentially of the core. However, if the cable core has the above-mentioned indentations and projections, such irregularities also occur in the layer 7. When the sheath 8 is then extruded over the layer 7, the sheath 8 will be adhered to the layer 7 effectively at the projections but improperly at the indentations. Such improper adhesion can be substantially avoided by diminishing the indentations and projections on the layer 6, for example, by butt-winding the tape or ½ lap-winding the tape as shown in FIG. 4 to reduce the width of the indentations in the layer 6 to 1 mm or smaller, or by further winding a thin holding tape around indented portions of large width to reduce the depth of the indentations to not larger than 100 μm, preferably not larger than 50 μm.

The present invention will be described in greater detail with reference to the following examples and comparative examples. However, the invention is not limited to these examples only. In the following examples and comparative examples, the parts and percentages are all by weight unless otherwise specified. Table 3 shows the terms which are used in the form of abbreviations in Tables 1 and 2.

EXAMPLES 1–13

Table 1 shows the structures of four-layer shielding tapes the same as the one shown in FIG. 1 and each comprising a lead foil, vinyl chloride polymer layers provided on opposite sides of the foil, and an adhesive layer formed over the surface of one of the polymer layers. The symbols t1 to t4 representing the layers and listed in Table 1 are in match with those used in FIG. 1. The adhesives used in the examples were dissolved in a solvent mixture of methyl ethyl ketone and toluene (1:1, by volume) to prepare 20% solutions. The solution was used for adhering the vinyl chloride polymer layers to the lead foil and for forming the adhesive layer. First, the lead foil was coated with the solution on its opposite surfaces, and the solvent was then evaporated off. A film of vinyl chloride polymer material listed was placed over the coated surfaces, and the assembly was heated at 180° C. to obtain a three-layer laminate. Subsequently the surface of one of the polymer layers was directly coated with the adhesive solution, and the solvent was evaporated off to form an adhesive layer.

EXAMPLES 14–29

Table 2 shows the structures of five-layer shielding tapes the same as the one shown in FIG. 2. The symbols t1 to t5 representing the layers and listed in Table 2 are in match with those used in FIG. 2.

In Examples 14 to 19, the layer t1 was adhered to the layer t2 in the same manner as in Example 1 using the adhesive which was used for forming the layer t4 in the example concerned. In Examples 20 to 29 in which the layer t2 was conductive, the following adhesives were used for adhering the layer t2 to the layer t1.

Examples 20 to 24: Conductive adhesive (volume resistivity: $5.1 \times 10^2$ μ·cm) comprising 100 parts of vinyl chloride-vinyl acetate copolymer (average polymerization degree: 800, vinyl acetate content: 15%), 40 parts of dioctyl phthalate and 20 parts of Ketzen Black ® (BET surface area: 1,000 m²/g, oil absorption: 340 ml/100 g).

Examples 25 to 27: Conductive adhesive (volume resistivity: $2.0 \times 10^3$ μ·cm) comprising 100 parts of vinyl chloride-vinyl acetate-maleic acid copolymer (average polymerization degree: 400, vinyl acetate content: 13%), 40 parts of dioctyl sebacate and 15 parts of the above-mentioned Ketzen Black.

Examples 28 and 29: Conductive adhesive (volume resistivity: $3.5 \times 10^5$ Ω·cm) comprising 100 parts of the above-mentioned vinyl chloride-vinyl acetate copolymer, 30 parts of butadiene-acrylonitrile rubber (average molecular weight: 50,000), 30 parts of dioctyl phthalate and 10 parts of the above-mentioned Ketzen Black.

The layer t1 was adhered to the layer t5, and the layer t5 to the layer t3, with use of a polyurethane adhesive of the ether type ( Takelac, A-967/A-7, product of Takeda Chemical Industries, Ltd.) in Examples 14 to 18 and 25 to 29, an epoxy adhesive ( S-Dine #3450, product of Sekisui Esdine Co., Ltd.) in Example 19, a urethane adhesive of the ester type ( Takelac, A-310/A-3, product of Takeda Chemical Industries, Ltd.) in Examples 20 to 22, and an acrylic adhesive (Threebond, #3920/#3925, product of Threebond Co., Ltd., in Examples 23 and 24. The adhesives were cured by reaction for adhesion.

COMPARATIVE EXAMPLES 1 AND 2

Tapes were prepared exactly in the same manner as in Example 1 except that the vinyl chloride polymer was replaced by polyethylene terephthalate (Comparative Example 1) or by 12 nylon (Comparative Example 2) for forming the layer t3.

TABLE 1

| Example No. | Lead foil (t1) Thickness (μm) | VCP layer (t2 and t3) Material (parts) | Thickness (μm) | Adhesive layer (t4) Adhesive (parts) | thickness (μm) |
|---|---|---|---|---|---|
| 1 | 50 | PVC | 50 | VC.VA(M:560,VA:15%) 85 DOP 15 | 5 |
| 2 | " | " | " | VC.VA.MA(M:400,VA:13%, MA:1%) 85 DBP 15 | " |
| 3 | " | PVC 100 DOP 40 | " | NR(W:5000,AN:41%) 60 ER(W:900) 40 | 10 |
| 4 | " | PVC 100 DBP 40 | " | CR(W:70,000) 75 RCl(Cl:67%) 25 | " |
| 5 | " | PVC | " | VC.VA(M:800,VA:15%) 65 PR(M:150) 20 DOP 15 | 5 |
| 6 | " | PVC 100 DOP 40 | " | VC.VA(M:560,VA:15%) 70 NR(W:20,000,AN:41%) 30 | 7 |
| 7 | " | " | " | VC.VA(M:560,VA:15%) 70 ER(W:900) 20 | 5 |

TABLE 1-continued

| Example No. | Lead foil (t1) Thickness (μm) | VCP layer (t2 and t3) Material (parts) | Thickness (μm) | Adhesive layer (t4) Adhesive (parts) | thickness (μm) |
|---|---|---|---|---|---|
| 8 | " | " | " | TCP 10<br>VC.VA.MA(M̄:350,VA:7%, MA:6%) 90 | " |
| 9 | " | PVC 100<br>DBP 40 | " | ER(W̄:350) 10<br>BAE(W̄:10,000) 70 | 5 |
| 10 | " | PVC | " | ER(W̄:900) 30<br>BAE(W̄:10,000) 70<br>PR(W̄:150) 30 | " |
| 11 | 40 | VC.E(E:4.5%) | 50 | Same as Example 2 | 5 |
| 12 | 100 | VC.CVE(CVE:7%) | 80 | Same as Example 9 | " |
| 13 | 50 | VCG.EVA(VCG:92%) | 60 | " | " |

TABLE 2

| Ex. No. | Layer t1 Thickness (μm) | Layer t2 Material (parts) | Thickness (μm) | Layer t3 Material (parts) | Thickness (μm) | Layer t4 Material (parts) | Thickness (μm) | Layer t5 Material (parts) | Thickness (μm) |
|---|---|---|---|---|---|---|---|---|---|
| 14 | 50 | PVC | 50 | PVC | 50 | Same as Ex. 1 | 5 | PET | 50 |
| 15 | " | " | " | " | " | Same as Ex. 2 | " | " | " |
| 16 | " | " | " | " | " | Same as Ex. 2 | 8 | PBT | 70 |
| 17 | " | " | " | VCG.EVA (VCG:92%) | " | Same as Ex. 6 | 10 | " | " |
| 18 | 60 | PVC 100<br>DIDP 10 | 60 | PVC | 60 | Same as Ex. 5 | 5 | PET | 40 |
| 19 | 50 | VCG.EVA | 50 | VCG.EVA (VCG:92%) | 50 | Same as Ex. 8 | 7 | " | " |
| 20 | " | PVC 100<br>AB 70<br>DOP 60 | 50 | PVC | 50 | Same as Ex. 1 | " | N-12 | " |
| 21 | " | " | " | PVC 100<br>DOP 40 | " | Same as Ex. 2 | " | PET | " |
| 22 | " | " | " | " | " | Same as Ex. 6 | " | " | " |
| 23 | " | PVC 100<br>AB 50<br>TCP 60 | " | " | " | Same as Ex. 2 | " | " | " |
| 24 | " | PVC 100<br>AB 50<br>DBP 60 | " | " | " | Same as Ex. 2 | " | " | " |
| 25 | " | " | " | PVC 100<br>DIDP 40 | " | " | " | " | " |
| 26 | " | PVC 100<br>KB 20<br>DIDP 20 | " | " | " | Same as Ex. 8 | " | " | " |
| 27 | " | " | " | " | " | Same as Ex. 6 | " | " | " |
| 28 | " | " | " | " | " | Same as Ex. 2 | " | PBT | " |
| 29 | " | " | " | " | " | Same as Ex. 2 | " | PS | " |

TABLE 3

| | |
|---|---|
| AB | Acetylene black |
| AN | Content of acrylonitrile component |
| BAE | Butyl acrylate polymer |
| Cl | Content of chlorine component |
| CR | Chloroprene rubber |
| CVE | Content of cetyl vinyl ether |
| DBP | Dibutyl phthlate |
| DIDP | Diisodecyl phthalate |
| DOP | Dioctyl phthalate |
| E | Content of ethylene component |
| ER | Epoxy resin |
| KB | Ketzen Black$^R$ |
| M | Average polymerization degree |
| MA | Content of maleic acid |
| N-12 | 12 Nylon (T.S. 5 kg/mm$^2$) |
| NR | Butadiene-acrylonitrile rubber |
| PBT | Polybutylene terephthalate (T.S. 5.6 kg/mm$^2$) |
| PET | Polyethylene terephthalate (T.S. 22 kg/mm$^2$) |
| PR | Phenolic resin |
| PS | Polysulfone (T.S. 8 kg/mm$^2$) |
| PVC | Vinyl chloride homopolymer |
| RCl | Chlorinated rubber |
| TCP | Tricresyl phosphate |
| T.S. | Tensile strength |
| VA | Content of vinyl acetate |
| VC.CVE | Vinyl chloride-cetyl vinyl ether copolymer |
| VC.VA | Vinyl chloride-vinyl acetate copolymer |
| VC.VA.MA | Vinyl chloride-vinyl acetate-maleic acid copolymer |
| VC.E | Vinyl chloride-ethylene copolymer |
| VCG | Content of grafted vinyl chloride component |
| VCG.EVA | Ethylene-vinyl acetate polymer grafted with vinyl chloride |
| VCP | Vinyl chloride polymer |
| W̄ | Average molecular weight |

The tapes of Examples 1 to 29 and Comparative Examples 1 and 2 were tested by the following method for the adhesion to the vinyl chloride polymer sheath and also for the stability of the adhesion.

Three kinds of 2-mm-thick tapes of soft vinyl chloride homopolymer were prepared which were composed of vinyl chlorie homopolymer and 45 parts, per 100 parts of the homopolymer, of di-n-octyl phhalate (hereinafter referred to as "A tape"), diisodecyl phthalate (B tape) or tricresyl phosphate (C tape).

A rubber roll and a stainless steel roll which was adjusted to a surface temperature of 180° C. were rotated at a circumferential speed of 46 cm/min as opposed to each other. The 2-mm-thick tape was placed over the adhesive layer of the tape of each of Examples in direct contact therewith, and the two tapes were passed through the nip of the rolls and thereby adhered together, with the 2-mm-thick tape in contact with the rubber roll and the layer t2 of the tape of Example in contact with the stainless steel roll. The surface pressure to be applied to the tapes at the nip of rolls was adjusted to about 0.8 kg/cm² which is approximately at the same level as the surface pressure to be exerted by the sheath extrudate.

The sample of adhered tapes was allowed to stand for one month in a dry air chamber at a constant temperature of 70° C. or in water at 40° C.

Table 4 shows the initial bond strength between the tapes of Examples and the three kinds of 2-mm-thick tapes, and also the bond strength therebetween after standing in air or water. To determine the bond strength, the peel strength at 180 degrees was measured according to ASTM D-9031, and the peel strength (kg/10 mm) per 10 mm width was calculated.

EXAMPLES 30–43, COMPARATIVE EXAMPLE 3

A cable core, 63 mm in outside diameter, was used which was prepared by laterally winding a copper tape around an insulation shielding layer to form a metal shield layer, and ½ lap-winding a cotton holding tape (listed merely as "cotton tape" in Table 5) having a thickness of 600 μm and a width of 60 mm around the metal shield layer, or a conductive cotton holding tape (referred to merely as "conductive tape" in Table 5) having a thickness of 600 μm, a width of 60 mm and a volume resistivity of $3 \times 10^2$ Ω·cm around the metal shield layer to form a holding layer. A water impermeable layer was formed over the cable core from the shielding tape of each of Examples and Comparative Example, by longitudinally placing the tape around the cable core with a lap, with the adhesive layer t4 out, and thermally adhering the lap at the same time. Subsequently a sheath, 4 mm in wall thickness, was formed over the water impeameable layer from a composition comprising 100 parts of vinyl chloride homopolymer, 40 parts of diisodecyl phthalate, 5 parts of tribasic lead sulfate, 2 parts of dibasic lead stearate and 2 parts of carbon pigment, by extruding the composition onto the layer at 180° C.

The power cable thus obtained and having the water impermeable layer was repeatedly bent 20 times to a curved form having a diameter of 10 times the outside diameter of the cable and then checked for the adhesion between the water impermeable layer and the sheath and for buckle or wrinkle in the water impermeable layer. Furthermore, a test piece collected from the cable before the bending test was tested for 180 degrees peel strength between the sheath and the water impermeable layer according to ASTM D-903. Table 5 shows the structures of the cables prepared in the present examples and the test results.

TABLE 4

| | Bond Strength (kg/10mm) | | | | | | | | |
|---|---|---|---|---|---|---|---|---|---|
| | Initial | | | After Air Heating | | | After Immersion In Water | | |
| | Tape A | Tape B | Tape C | Tape A | Tape B | Tape C | Tape A | Tape B | Tape C |
| Example No. | | | | | | | | | |
| 1 | 3.2 | 3.2 | 3.2 | 3.5 | 3.5 | 3.5 | 2.1 | 2.0 | 1.9 |
| 2 | 2.9 | 3.0 | 3.0 | 3.2 | 3.1 | 3.0 | 2.1 | 1.9 | 2.0 |
| 3 | 1.9 | 2.0 | 1.9 | 2.0 | 2.1 | 2.5 | 1.9 | 1.9 | 1.4 |
| 4 | 3.5 | 3.5 | 3.7 | 1.5 | 1.7 | 1.7 | 1.2 | 1.3 | 1.2 |
| 5 | 3.3 | 3.4 | 3.2 | 1.8 | 1.7 | 1.6 | 1.9 | 2.1 | 2.1 |
| 6 | 3.3 | 3.4 | 3.4 | 2.8 | 2.8 | 2.5 | 2.8 | 2.7 | 2.5 |
| 7 | 3.4 | 3.5 | 3.5 | 3.0 | 3.2 | 2.8 | 2.2 | 2.3 | 2.3 |
| 8 | 3.4 | 3.5 | 3.2 | 2.5 | 2.5 | 2.3 | 1.9 | 1.9 | 2.2 |
| 9 | 3.3 | 3.4 | 3.5 | 3.0 | 3.1 | 3.1 | 2.1 | 2.2 | 2.2 |
| 10 | 3.0 | 3.2 | 3.1 | 3.1 | 2.5 | 2.5 | 1.8 | 1.8 | 1.5 |
| 11 | 2.1 | 2.2 | 2.2 | 1.9 | 1.7 | 1.4 | 1.7 | 1.5 | 1.3 |
| 12 | 2.3 | 2.4 | 2.4 | 1.5 | 1.5 | 1.5 | 1.0 | 1.2 | 1.1 |
| 13 | 2.5 | 2.4 | 2.3 | 2.8 | 2.6 | 2.5 | 1.5 | 1.7 | 1.6 |
| 14 | 3.3 | 3.2 | 3.2 | 3.4 | 3.6 | 3.7 | 2.1 | 2.3 | 2.5 |
| 15 | 3.1 | 3.0 | 3.0 | 3.0 | 2.9 | 2.8 | 2.4 | 2.3 | 2.7 |
| 16 | 3.2 | 3.0 | 3.1 | 3.1 | 2.9 | 3.4 | 2.2 | 2.1 | 2.1 |
| 17 | 3.3 | 3.5 | 3.6 | 3.1 | 3.7 | 2.9 | 2.3 | 1.9 | 2.5 |
| 18 | 3.5 | 3.5 | 3.5 | 1.9 | 1.9 | 2.3 | 1.5 | 1.7 | 1.9 |
| 19 | 3.0 | 3.0 | 2.9 | 2.7 | 2.6 | 1.8 | 1.7 | 1.7 | 1.6 |
| 20 | 3.3 | 3.2 | 3.1 | 3.4 | 3.5 | 3.3 | 2.2 | 1.6 | 1.5 |
| 21 | 3.0 | 3.0 | 3.0 | 2.9 | 3.0 | 3.3 | 2.0 | 1.9 | 1.8 |
| 22 | 3.3 | 3.3 | 3.4 | 2.6 | 2.7 | 2.8 | 2.5 | 2.6 | 2.7 |
| 23 | 3.0 | 3.0 | 3.0 | 3.3 | 3.2 | 2.9 | 2.2 | 2.0 | 1.9 |
| 24 | 3.1 | 3.1 | 3.1 | 3.4 | 3.0 | 3.3 | 2.0 | 1.9 | 1.9 |
| 25 | 3.0 | 3.2 | 3.0 | 3.4 | 3.5 | 3.1 | 1.9 | 1.9 | 1.4 |
| 26 | 3.5 | 3.6 | 3.6 | 2.3 | 2.2 | 2.1 | 1.6 | 1.7 | 1.6 |
| 27 | 3.3 | 3.2 | 3.2 | 2.7 | 2.6 | 2.6 | 2.3 | 2.2 | 2.4 |
| 28 | 3.0 | 2.9 | 2.8 | 3.3 | 3.1 | 2.7 | 1.9 | 2.0 | 1.7 |
| 29 | 3.0 | 2.9 | 3.1 | 3.6 | 3.2 | 1.7 | 1.5 | 1.4 | |
| Comparative Ex. 1 | 0.54 | 0.45 | 0.37 | 0.56 | 0.58 | 0.67 | 0.00 | 0.00 | 0.00 |
| Com- | 0.38 | 0.40 | 0.41 | 0.42 | 0.45 | 0.47 | 0.00 | 0.00 | 0.00 |

TABLE 4-continued

| | Bond Strength (kg/10mm) | | | | | | | | |
|---|---|---|---|---|---|---|---|---|---|
| | Initial | | | After Air Heating | | | After Immersion In Water | | |
| | Tape A | Tape B | Tape C | Tape A | Tape B | Tape C | Tape A | Tape B | Tape C |
| parative Ex. 2 | | | | | | | | | |

TABLE 5

| Example No. | Kind of Holding Tape | Kind of Shielding Tape | Initial Peel Strength Between Sheath and Shielding Tape (kg/mm) | Shielding Tape as Observed After Cable Bending | | |
|---|---|---|---|---|---|---|
| | | | | Separation from Sheath | Wrinkle | Crack of Lead Foil |
| 30 | Cotton Tape | Same as Ex. 1 | 2.7 | None | None | None |
| 31 | " | Same as Ex. 2 | 2.6 | " | " | " |
| 32 | " | Same as Ex. 3 | 1.9 | So Slight | So Slight | " |
| 33 | " | Same as Ex. 14 | 2.7 | None | None | " |
| 34 | Conductive | Same as Ex. 20 | 2.4 | " | " | " |
| 35 | " | Same as Ex. 21 | 2.2 | So Slight | So Slight | " |
| 36 | " | Same as Ex. 22 | 2.2 | " | " | " |
| 37 | " | Same as Ex. 23 | 2.1 | " | " | " |
| 38 | " | Same as Ex. 24 | 2.6 | " | " | " |
| 39 | " | Same as Ex. 25 | 2.5 | " | " | " |
| 40 | " | Same as Ex. 26 | 2.7 | " | " | " |
| 41 | " | Same as Ex. 27 | 2.4 | " | " | " |
| 42 | " | Same as Ex. 28 | 2.2 | So Slight | So Slight | " |
| 43 | " | Same as Ex. 29 | 2.2 | " | " | " |
| Comparative Ex. 3 | Cotton Tape | Same as Comparative Ex. 1 | 0.40 | Observed | Observed | Observed |

What is claimed is:

1. A shielding tape comprising a lead foil having a thickness of 10 to 300 $\mu$m, a vinyl chloride polymer layer having a thickness of 5 to 500 $\mu$m, provided on each side of the lead foil and made of a vinyl chloride polymer at least 1.5 kg/mm$^2$ in tensile strength and at least 1 kg/mm$^2$ in 100% modulus, and a layer of a non-reaction-curable adhesive provided on the vinyl chloride polymer layer on one side of the lead foil.

2. A shielding tape as defined in claim 1 wherein a heat-resistant organic polymer layer 10 to 300 $\mu$m in thickness and at least 200° C. in softening point or melting point is provided between the lead foil and at least one of the vinyl chloride polymer layers.

3. A shielding tape as defined in claim 2 wherein the heat-resistant organic polymer layer is provided between the lead foil and the vinyl chloride polymer layer having the adhesive layer thereon.

4. A shielding tape as defined in any one of claims 1 to 3 wherein the non-reaction-curable adhesive becomes adhesive when softened or melted by heat and has a solubility parameter value of 8 to 12 and a Vicat softening point of 70° to 150° C.

5. A shielding tape as defined in claim 2 or 3 wherein the vinyl chloride polymer layer not having the adhesive layer thereon is made of a conductive vinyl chloride polymer having a volume resistivity of lower than 10$^7$ $\Omega$·cm and is adhered to the lead foil with a conductive adhesive having a volume resistivity of lower than 10$^7$ $\Omega$·cm.

6. A shielding tape as defined in claim 2 or 3 wherein the heat-resistant organic polymer is polyethylene terephthalate.

7. A shielding tape as defined in claim 1, 2 or 3 wherein the adhesive layer comprises vinyl chloride-vinyl acetate copolymer or vinyl chloride-vinyl acetate-maleic acid copolymer.

8. An electric cable comprising a core, a sheath of vinyl chloride polymer and a water impermeable layer of a shielding tape longitudinally placed beneath the sheath and composed of a lead foil and a layer of vinyl chloride polymer formed over each surface of the lead foil, the sheath being adhered to the underlying vinyl chloride polymer layer of the shielding tape with a non-reaction-curable adhesive, the shielding tape overlapping itself with its vinyl chloride polymer layers adhered to each other at the lap with the same type of adhesive as above.

9. An electric cable as defined in claim 8 wherein the core of the cable is enveloped with the water impermeable layer and has a metal shield layer, and the vinyl chloride polymer layer immediately adjacent the cable core is conductive and adhered to the lead foil with a conductive adhesive to electrically connect the metal shield layer to the lead foil.

* * * * *